United States Patent [19]
Yamaguchi et al.

[11] Patent Number: 5,474,830
[45] Date of Patent: Dec. 12, 1995

[54] MAGNETIC RECORDING MEDIUM AND METHOD FOR THE MANUFACTURE THEREOF INCLUDING SPACED APART DEPOSITS

[75] Inventors: Kiyoto Yamaguchi, Kanagawa; Hiroyuki Uwazumi, Nagano; Kenji Ozawa; Hisasi Yamasaki, both of Kanagawa, all of Japan

[73] Assignee: Fuji Electric Co., Ltd., Japan

[21] Appl. No.: 99,353

[22] Filed: Jul. 30, 1993

[30] Foreign Application Priority Data

Aug. 6, 1992 [JP] Japan ................... 4-209310

[51] Int. Cl.⁶ ................ G11B 5/66; G11B 5/70; B32B 9/04; C23C 14/32
[52] U.S. Cl. ............ 428/141; 204/192.1; 204/192.2; 428/161; 428/611; 428/612; 428/660; 428/666; 428/681; 428/694 T; 428/694 TS; 428/694 TP; 428/694 TR; 428/704; 428/900
[58] Field of Search ............ 428/209, 332, 428/336, 611, 612, 621, 660, 666, 678, 704, 694 TP, 694 TR, 694 BR, 694 BN, 694 SG, 694 T, 141, 161, 900, 928 TS; 204/192.1, 192.2

[56] References Cited

U.S. PATENT DOCUMENTS

| | | | |
|---|---|---|---|
| 4,499,138 | 2/1985 | Yamamoto | 428/216 |
| 4,643,915 | 2/1987 | Arai et al. | 427/130 |
| 5,134,038 | 7/1992 | Baseman et al. | 428/611 |

FOREIGN PATENT DOCUMENTS

| | | |
|---|---|---|
| 0399747 | 11/1990 | European Pat. Off. . |
| 2402481 | 7/1974 | Germany . |
| 3803014A1 | 8/1989 | Germany . |
| 60-136035 | 7/1985 | Japan . |
| 1-134720 | 5/1989 | Japan . |
| 1-146132 | 6/1989 | Japan . |
| 3-73419 | 3/1991 | Japan . |

*Primary Examiner*—Paul J. Thibodeau
*Assistant Examiner*—Stephen Sand
*Attorney, Agent, or Firm*—Parkhurst, Wendel & Rossi

[57] ABSTRACT

To improve the sliding characteristics of a magnetic head by reducing a friction coefficient, and realize a magnetic recording medium with a high recording density and a large capacity, capable of reducing the flotation distance of the magnetic head. On the surface of a base, aluminum containing nitrogen aggregates locally to form islands of metal deposits, which are distributed discretely over the entire surface of the base. Meanwhile, on the metal deposits, a metal base layer, a magnetic layer, a protective layer, and a lubrication layer are laminated sequentially to form a magnetic recording disk. On the disk surface, ultrafine irregularities are formed that reflect the shapes of the metal deposits, thereby realizing a reduction in the friction coefficient.

6 Claims, 4 Drawing Sheets

BASE SUBSTANCE TEMPERATURE DEPENDENCE

MAGNETIC RECORDING MEDIUM AND METHOD FOR THE MANUFACTURE THEREOF INCLUDING SPACED APART DEPOSITS

FIELD OF THE INVENTION

The present invention relates to a magnetic recording medium and a method for the manufacture thereof, and more particularly to a technology intended to achieve a higher recording density of the magnetic recording medium by realizing a smaller flotation distance in the magnetic head by forming ultrafine irregularities on the surface of an uppermost layer of the magnetic recording medium.

BACKGROUND OF THE INVENTION

A fixed magnetic disk device has often been used in recent years as an external recording device for information processing devices including computers. FIG. 6 shows the magnetic recording disk (magnetic recording medium) generally used in this fixed magnetic disk device. The magnetic recording disk has a non-magnetic metal layer 12 formed on a non-magnetic substrate 11 which forms a non-magnetic base 1. A non-magnetic metal base layer 2 is laminated on the non-magnetic base 1 and a magnetic layer 3 is formed on the metal base layer 2. The magnetic layer 3 consists of a ferromagnetic alloy of cobalt-chrome-tantalum (Co-Cr-Ta) in thin film form. An amorphous carbon protective layer 4 if from on the magnetic layer 3. The magnetic recording disk also includes a lubrication layer 5 disposed on the protective layer 4.

The non-magnetic base 1 used in the device may include a glass substrate 11 that has been subjected to mirror grinding and formed with the non-magnetic metal layer 12 consisting of Cr, an anodized aluminum (such as ALUMITE) base substance or a ceramic base substrate. This non-magnetic base 1 may be polished and formed with irregularities using textures as required. The metal base layer 2 consists of Cr with a film thickness of 1000 Å. The magnetic layer 3 is composed of $Co_{86}Cr_{12}Ta_2$ with a film thickness of 500 Å. The protective layer 4 includes amorphous carbon with a film thickness of 200 Å. The layers are laminated in the above order using a sputtering process while heating the non-magnetic base substance to 320° C. and applying a DC voltage of 200 V. Furthermore, a fluorocarbon-based liquid lubrication agent is coated on the protective layer 4 to form a lubrication layer 5 with a film thickness of 20 Å. A magnetic recording disk thus manufactured exhibits good mechanical properties such as mechanical strength and dimensional accuracy, as well as good magnetic properties such as a coercive force Hc as good as about 1300 Oe and a Br.d which is a product of residual magnetic flux density and the magnetic layer film thickness as good as about 400G. μm.

As a result of the increase in the amount of information available, as well as its increased diversity in recent years, the needs of large quantity processing of information have created a strong demand requiring that fixed magnetic disk devices have a higher recording density and a larger capacity. Accordingly, also in magnetic recording disks used in magnetic disk devices, a medium that can further reduce the flotation distance of the magnetic head is required to comply with the need for a higher recording density and a larger capacity. Generally, magnetic disk devices use a contact-start-stop (CSS) system to read and write information, wherein a magnetic head in operation floats slightly above a magnetic recording disk to read or write information. In this CSS system when the operation is stopped, the magnetic head contacts the magnetic recording disk surface. Therefore, if the magnetic recording disk surface has been mirror-polished, the magnetic head may get stuck on the magnetic recording disk surface because of the large coefficient of friction that exists between the magnetic head and the magnetic recording disk. In addition, a large frictional force generated from the magnetic head sliding on the magnetic recording surface upon actuation may cause the magnetic layer to become worn out. Therefore, although the magnetic recording disk with a construction as shown in FIG. 6 has superior surface smoothness making it possible to reduce the flotation distance of the magnetic head, it is also not so reliable as a magnetic recording disk because of the sliding characteristics of the magnetic head as described above. On the other hand, increasing the surface roughness on the magnetic recording disk reduces the coefficient of friction between the magnetic recording disk surface and the magnetic head, thereby making it possible to prevent the magnetic head from getting stuck on the magnetic recording disk, which improves the sliding characteristics of the magnetic head. However, increasing the surface roughness on the magnetic recording disk causes a problem in that it requires a larger flotation distance for the magnetic head to prevent a head crash, which in turn prevents any increase in the recording capacity.

In the light of these problems, it is the objective of the present invention to provide a magnetic recording medium and a method for the manufacture thereof that can improve the sliding characteristics of a magnetic recording disk while maintaining a small surface roughness and increasing the recording density and capacity by the reducing flotation distance for the magnetic head.

SUMMARY OF THE INVENTION

In order to achieve the above objective, the magnetic recording medium according to the present invention uses a means that, by forming irregularities fine enough to maintain a small surface roughness on a protective layer, the coefficient of friction with a magnetic head is reduced so that a magnetic recording medium that satisfies both requirements for the sliding characteristics and the flotation characteristics is realized. The magnetic recording medium comprises, at least a non-magnetic metallic base layer formed on the surface of a non-magnetic base, a thin film magnetic layer made of ferromagnetic alloy formed on the metallic base layer, and a protective layer formed on the surface of the thin film non-magnetic layer, wherein on at least one of the surfaces of said non-magnetic substrate and said thin film magnetic layer, irregularities distributed discretely via non-magnetic metal deposits containing nitrogen are formed, such irregularities being reflected up to the surface of said protective layer.

In this magnetic recording medium, it is preferable that, if the size of said metal deposits is assumed to be "d" and the space between said metal deposits is assumed to be "t", "d" is within a range of 15 nm to 200 nm, and "t" is within a range of d/5 to 5d.

The non-magnetic metal forming said metal deposits shall preferably be one type of metal selected from a group consisting of Al, Ta, Ti, Si, B, Zr and Cr, or an alloy of more than two types.

A method for the manufacture of a magnetic recording medium can adopt a sputtering process to form metal deposits under a sputtering gas mixture atmosphere composed of argon gas and nitrogen gas, with said non-magnetic base heated to a predetermined temperature. In this case, it is preferable that the heating temperature for the non-magnetic base be within a range of 150° C. to 400° C., and the partial pressure ratio of nitrogen gas to the sputtering gas mixture be within a range of 0.5% to 20%.

In the magnetic recording medium using the means described above according to the present invention, a non-magnetic metal layer containing nitrogen formed on at least one of the surfaces of a non-magnetic base and a thin magnetic film layer are distributed discretely as locally condensed metal deposits, forming fine irregularities on the entire surface of a predetermined film, rather than covering the predetermined film with a film of uniform thickness. Because this causes fine irregularities that reflect the irregular forms of the metal deposits to be formed on the surface of a protective layer (a lubrication layer) on the magnetic recording medium, the surface roughness can be reduced and the flotation distance on the magnetic head can also be reduced. In addition, the coefficient of friction between the magnetic recording medium and the magnetic head can also be reduced, thus realizing a magnetic recording medium with good sliding characteristics. Consequently, it becomes possible to provide a magnetic recording medium that can cope with the various types of magnetic heads used to increase the recording density.

Since the irregularities formed on the protective layer surface reflect the irregular shapes of the metal deposits, the surface roughness on the protective layer can be controlled to the desired value by controlling the shapes of the metal deposits. That is, if the metal deposits are so formed that the size of the metal deposits "d" is within a range of 15 nm to 200 nm in diameter or width, and the space between the metal deposits "t" is within a range of d/5 to 5d, the surface roughness on the protective layer can be limited to a range of 3 nm to 7 nm at an average center line roughness "$R_a$" and a range of 20 nm to 65 nm at a maximum height "$R_{max}$". Additionally, because it becomes possible to keep the magnetic head flotation distance within a range of 1 μ inch to 3 μ inches, the recording density in the magnetic recording medium can be increased, and its tribology with the magnetic head can be is satisfied. The shapes of the metal deposits can be controlled by setting the sputtering condition in such a way that the heating temperature for the non-magnetic base is within a range of 150° C. to 400° C., and the partial pressure ratio of nitrogen gas in a sputtering gas mixture consisting of argon gas and nitrogen gas is within a range of 0.5% to 20%.

If the non-magnetic metal forming the metal deposits is made from one type of metal selected from a group including Al, Ta, Ti, Si, B, Zr and Cr, or an alloy of more than two types of the above metals, since any of these metals has a high nitride-forming capability, the metal deposits can be formed using approximately the same film forming process regardless of the kinds of metal or alloy selected. This ensures high productivity.

Next, a magnetic recording disk (magnetic recording medium) according to the present invention is explained with reference to the appended drawings.

DETAILED DESCRIPTION OF THE DRAWINGS

With the above as background, reference should now be made to the following detailed description of the preferred embodiment of the invention and the accompanying drawings, wherein:

FIG. 1 is a cross section showing a configuration of a magnetic recording disk (magnetic recording medium) according to a first embodiment of the present invention;

FIGS. 2(a) through (c) are a type drawing when the surface state of the irregular layer is observed corresponding to the change in the partial pressure ratio of nitrogen gas to the sputtering gas mixture used to form the irregular layer;

DETAILED DESCRIPTION OF THE PREFERRED EMBODIMENTS

Figure 1:
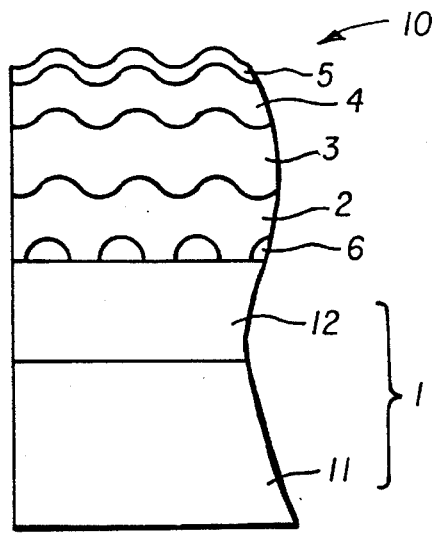

FIG. 1 is a cross section showing a magnetic recording disk (magnetic recording medium) according to a first embodiment of the present invention. Because the configuration of the magnetic recording disk 10 is approximately the same as that of conventional magnetic recording disks, the corresponding parts are given the same numerals, and the explanations thereof are omitted. In the magnetic recording disk 10 according to this embodiment, non-magnetic metal deposits 6 containing nitrogen are formed on the surface of a non-magnetic base 1 consisting of a glass substrate 11 and non-magnetic metal layer 12, and the shapes of the irregularities on the non-magnetic metal deposits 6 are reflected up to the surface of a lubrication layer 5 formed on a protective layer 4, while ultrafine irregularities are formed on the surface of the magnetic recording disk 10.

In the magnetic recording disk 10 with the above configuration, the surface of the disk-shaped glass substrate 11, which has been subjected to inner and outer diameter processing and face cutting, is first mirror-finished to an average center line roughness Ra of 5 Å to 15 Å via ultra precision surface grinding. Then, the glass substrate 11 is subjected to precision rinsing, set on a holder, and sent into a charging chamber of an in-line type magnetron sputtering device. This charging chamber is evacuated to a vacuum of $5\times10^{-6}$ Torr or lower, and the glass substrate 11 is heated to 150° C. Then, the holder set with the glass substrate 11 is delivered into a first film-forming chamber, which is filled with argon gas at a pressure of 5 mTorr where the non-magnetic metal layer 12 consisting of chromium and having a thickness of 500 Å is formed on the surface of the glass substrate 11 via sputtering to complete the base 1. Next, the base 1 is delivered into a second film-forming chamber, where the temperature of the base 1 is raised to a predetermined temperature of T° C. Subsequently, the second film-forming chamber is filled with (Ar+$N_2$) gas at a pressure of 50 mTorr under which the metal deposits 6 as a non-magnetic metal layer containing nitrogen are formed on the base 1 via a sputtering process which targets non-magnetic metal Al. The partial pressure ratio of the $N_2$ gas to the (Ar+$N_2$) gas is $P_{N2}$ in this case. A detailed explanation will be given later about temperature T in the base 1 when the metal deposits 6 are formed via a sputtering process and a partial pressure ratio $P_{N2}$ of the $N_2$ gas to the (Ar+$N_2$) gas.

Next, the holder set with the base 1 on which the metal deposits 6 are formed is delivered into a third film-forming chamber where the base 1 is heated to a temperature of 320° C. Then, while the chamber is kept at a zero potential as a reference potential and a DC voltage of −200 V is applied to the non-magnetic metal layer 12 of the base 1, the non-magnetic metal base layer 2, which is made of chromium with a thickness of 1000 Å, the magnetic layer 3 made from $Co_{86}Cr_{12}Ta_2$ alloy with a thickness of 500 Å, and the protective layer 4 made from amorphous carbon with a thickness of 200 Å are formed sequentially using a sputtering process. Finally, a fluorocarbon-based liquid lubricant is coated on the surface of the protective layer 4 to form a lubrication layer 5 with a thickness of 20 Å, thus completing the magnetic recording disk 10.

Figure 2A:
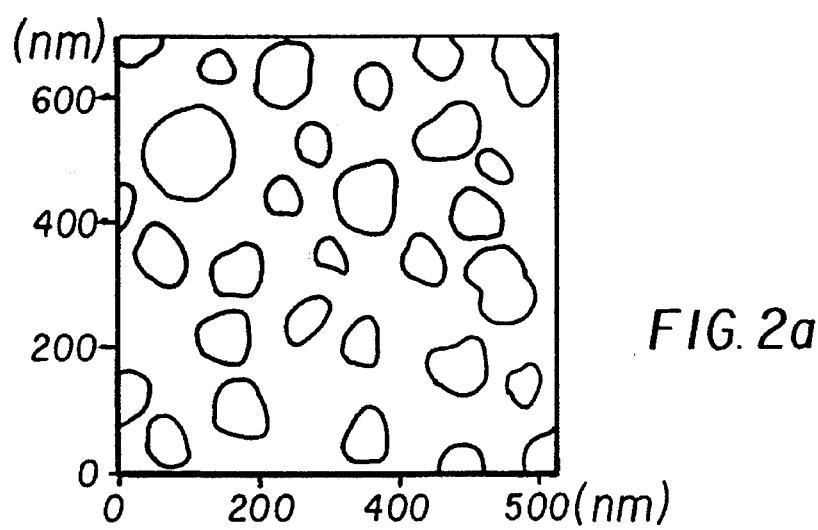
Figure 2B:
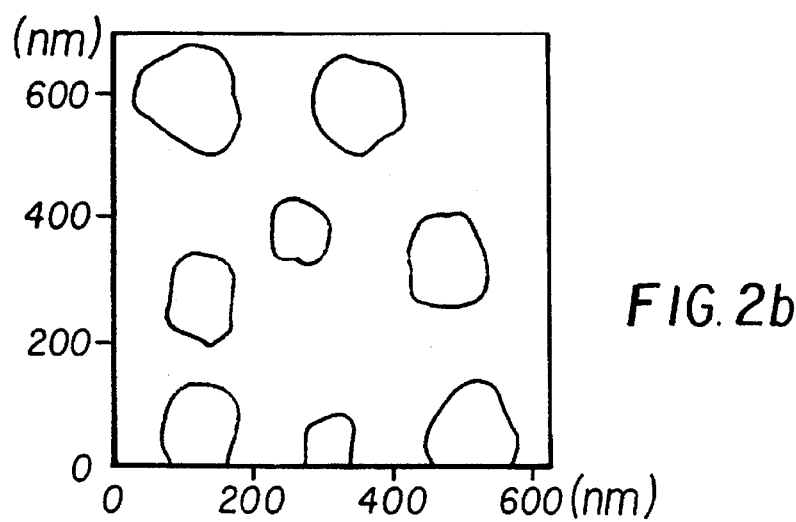
Figure 2C:
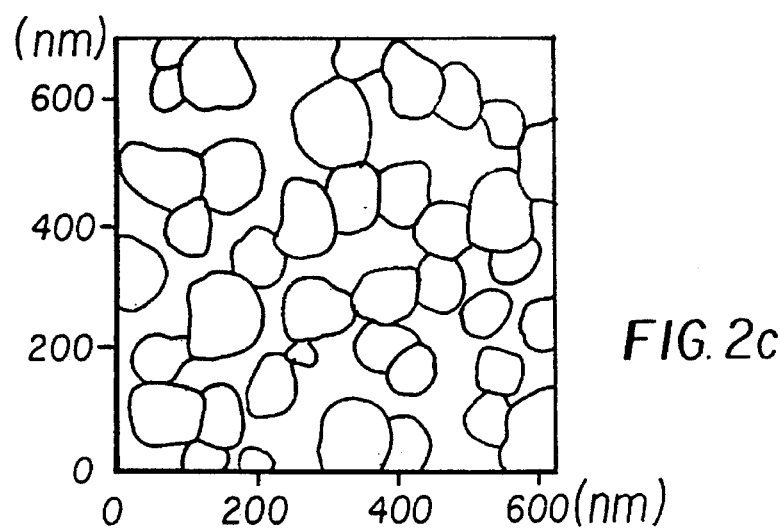

FIG. 2 shows a (plan) view observed by using an Atomic Force Microscope (AFM) on the surface of the base 1 after the metal deposits 6 have been formed thereon. FIGS. 2 (a) through (c) show the formed conditions of the metal deposits 6, which are formed by varying the partial pressure ratio $P_{N2}$ of the $N_2$ gas to the (Ar+$N_2$) gas used for forming the metal deposits 6, FIG. 2 (a) showing $P_{N2}$=1%, FIG. 2 (b) showing $P_{N2}$=10%, respectively, and FIG. (c) showing how the deposits are formed at $P_{N2}$=0% for the purpose of comparison.

In these figures, the metal deposits 6 are not formed with a uniform thickness over the entire surface of the base 1; rather, aluminum aggregates locally to form islands with irregularities to form deposits in an island-like film on which these islands are distributed discretely over the entire surface of the base 1. Moreover, this trend becomes more remarkable in proportion with the partial pressure ratio $P_{N2}$ of the $N_2$ gas to the (Ar+$N_2$) gas. That is, the size of the islands being the metal deposits 6 increases as the partial pressure ratio $P_{N2}$ of the $N_2$ gas increases, and the space between the islands grows larger, as can be seen in the figures.

Figure 3:
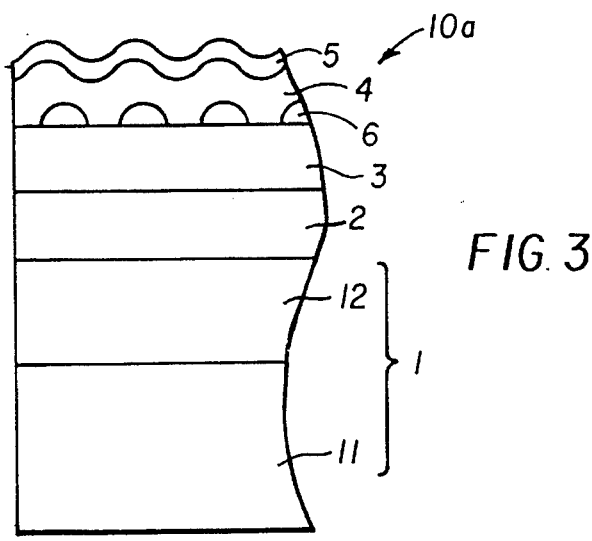
FIG. 3 is a cross section showing a configuration of a magnetic recording disk (magnetic recording medium) according to a second embodiment of the present invention.
Figure 6:
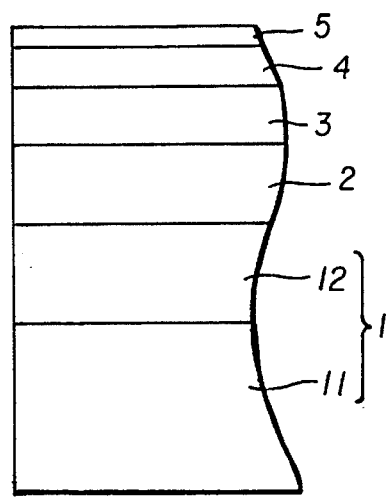
FIG. 6 is a cross section showing a configuration of a conventional magnetic recording disk (magnetic recording medium).

FIG. 3 is a cross section showing a magnetic recording disk (magnetic recording medium) according to the second embodiment of the present invention. In the magnetic recording disk 10a of this embodiment, the parts identical to those in the magnetic recording disk 10 of the first embodiment shown in FIG. 1 are given the same numerals, and their explanations are omitted. In this magnetic recording disk 10a, the point that differs from the magnetic recording disk 10 is that metal deposits 6 are formed on the surface of a magnetic layer 3.

The magnetic recording disk 10a of this embodiment can be manufactured using approximately the same processes as for the magnetic recording disk 10 of the first embodiment. In the magnetic recording disk 10a, a metal base layer 2 and the magnetic layer 3 are formed continuously on a base 1, and then the metal deposits 6 are formed on the magnetic layer 3 using the same sputtering process as in the first embodiment.

On a magnetic recording disk 10a with this configuration, the surface shapes of the metal deposits 6 were observed from their forming side using an AFM when the metal deposits 6 were formed on the magnetic layer 3 in the similar manner as in the first embodiment. As a result, it was observed that islands of the metal deposits 6 on which aluminum aggregates locally are distributed discretely over the entire surface of the magnetic layer 3, and it was verified that the formation conditions of the metal deposits 6 do not create a large difference irrespective of whether they are on the surface of the base 1 or on the surface of the magnetic layer 3. Therefore, it is possible to form equivalent shapes of irregularities on the disk surface regardless of whether the metal deposits 6 are formed on the surface of the base 1 or the surface of the magnetic layer 3. However, the magnetic recording disk 10 in the first embodiment, in which metal deposits 6 are formed on the base 1, is preferable for making the disk a medium with a higher recording density because the distance between the magnetic layer 3 and the magnetic head, or the so-called effective flotation distance is reduced.

Next, on the magnetic recording disk 10 in the first embodiment and the magnetic recording disk 10a in the second embodiment, reference is made to Tables 1 and 2 which show the investigation results on the characteristics of the magnetic recording disk relative to changes in the size "d" and the space "t", where "d" is the average size of a metal deposit 6, and "t" is the space between the metal deposits 6. Table 1 shows the magnetic recording disk characteristics focusing on the size "d" of the metal deposit 6, while Table 2 shows the magnetic recording disk characteristics focusing on the space "t" between the metal deposits 6.

The investigation thereof included measurements of the average center line roughness Ra, and in addition to the maximum height $R_{max}$, the dynamic friction coefficient $\mu_D$ (slide—$\mu$) when the thin-film magnetic head ($Al_2O_3$/Tic slider) slid at a speed of 100 rpm on the magnetic recording disk, and the static friction coefficient $\mu_s$ after a storage for 100 hours in an atmosphere of temperature at 25° C. and humidity at 80%. Here, the dynamic friction coefficient $\mu_D$ is a parameter for the wear characteristics, and the static friction coefficient $\mu_s$ is a parameter for the difficulty involved in getting stuck, —smaller values being preferable. Besides measuring the dynamic friction coefficient $\mu_D$, a 3 $\mu$-inch flotation test was performed to investigate the occurrence of problems such as head crush.

TABLE 1

| d (nm) | 6 | 12 | 15 | 130 | 200 | 260 |
|---|---|---|---|---|---|---|
| Ra (nm) | 1 | 2.5 | 3 | 4.5 | 7 | 9 |
| $R_{max}$ (nm) | 12 | 17 | 20 | 50 | 65 | 85 |
| $\mu_D$ | X | ○ | ○ | ○ | ○ | ○ |
| Floating characteristics | ○ | ○ | ○ | ○ | ○ | X |

In Table 1, the mark ○ in the column of the dynamic friction coefficient $\mu_D$ indicates $\mu_D \leq 0.4$, the mark indicates $0.4 < \mu_D \leq 0.7$, and the mark X indicates $0.7 < \mu_D$ respectively. The mark ○ in the floating characteristics column indicates that no problems such as head crush occurred, while the mark X indicates such a problem has occurred.

TABLE 2

| t | 0 | d/10 | d/5 | 2d | 5d | 7d |
|---|---|---|---|---|---|---|
| $\mu_D$ | X | ○ | ○ | ○ | ○ | X |
| $\mu_s$ | X |  | ○ | ○ | ○ | ○ |

In Table 2, the column of the dynamic friction coefficient $\mu_D$ is identical to that in Table 1. The mark ○ for the static friction coefficient $\mu_s$ indicates $\mu_s \leq 0.6$, the mark indicates $0.6 < \mu_s 1.2$, and the mark X indicates $1.2 < \mu_s$ (absorption), respectively.

In Table 1, the surface roughness in the magnetic recording disk has a larger value for "d" in both the average center line roughness Ra and the maximum height $R_{max}$, that is, it becomes larger as the metal deposits 6 become larger. Therefore, if the metal deposits 6 are small, the disk surface is very smooth, and the flotation characteristics of the magnetic head are well maintained. However, on the other hand, if the value for the dynamic friction coefficient $\mu_D$ is large, the sliding characteristics of the magnetic head is low. In contrast, if the metal deposits 6 are large, the disk surface roughness is also large, decreasing the dynamic friction coefficient $\mu_D$ and improving the sliding characteristics. However, head crash becomes more likely, and the flotation characteristics degrade. Therefore, in order to realize a magnetic recording disk that has both a good dynamic friction coefficient $\mu_D$ and good flotation characteristics, it is clear from Table 1 that the surface roughness must to be from 3 nm to 7 nm in the average center line roughness Ra, and from 20 nm to 65 nm in the maximum height $R_{max}$, characteristics which can be realized by making the size "d" in the metal deposits 6 from 15 nm to 200 nm.

Next, in Table 2, if the distance "t" between the metal deposits 6 is small, that is, the metal deposits 6 are formed close to each other, and the emergence of the irregular shapes is not distinct, both the values for the dynamic friction coefficient $\mu_D$ and the static friction coefficient $\mu_s$ will be large and the characteristics of the magnetic recording disk will be low. If the distance "t" is too large, the substantial contact area between the disk surface and the magnetic head increases, making to the dynamic friction coefficient $\mu_D$ increase as well, and the sliding characteristics of the magnetic head decrease. Therefore, it is understood from Table 2 that in order to realize a magnetic recording disk, which is good in terms of both the dynamic friction coefficient $\mu_D$ and the static friction coefficient $\mu_s$, the distance "t" must be between d/5 and 5d.

Figure 4:
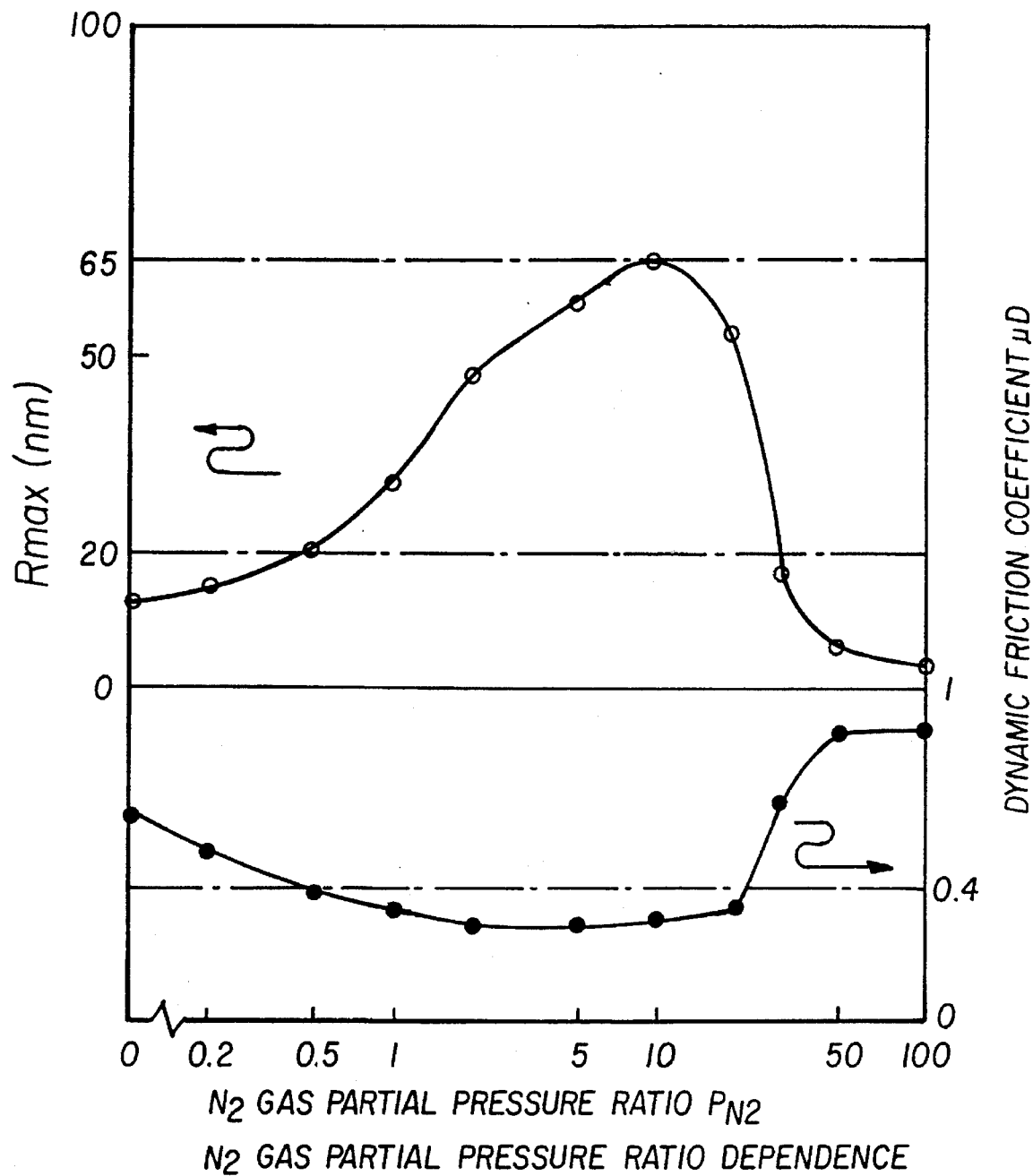
FIG. 4 is a graphic drawing showing the surface roughness on the magnetic recording disk (the maximum height $R_{max}$) associated with the change in the partial pressure ratio of nitrogen gas to the sputtering gas mixture used to form the metal deposits and the change in the dynamic friction coefficient $\mu_D$.

FIG. 4 shows the surface roughness on the magnetic recording disk associated with change in the partial pressure ratio $P_{N2}$ of $N_2$ gas in $(Ar+N_2)$ gas, which is used to form the metal deposits 6, and the change in the dynamic friction coefficient $\mu_D$. This figure illustrates that if the metal deposits 6 are formed with the partial pressure ratio $P_{N2}$ of the $N_2$ gas in $(Ar+N_2)$ gas within a range of 0.5% to 20%, the dynamic friction coefficient $\mu_D$ will show a good value of 0.4 or lower, and the disk surface roughness will be from 20 nm to 65 nm in the maximum height $R_{max}$. As a result, as shown in Table 1, a magnetic recording disk that is excellent in terms of both sliding characteristics and flotation characteristics will be realized.

Figure 5:
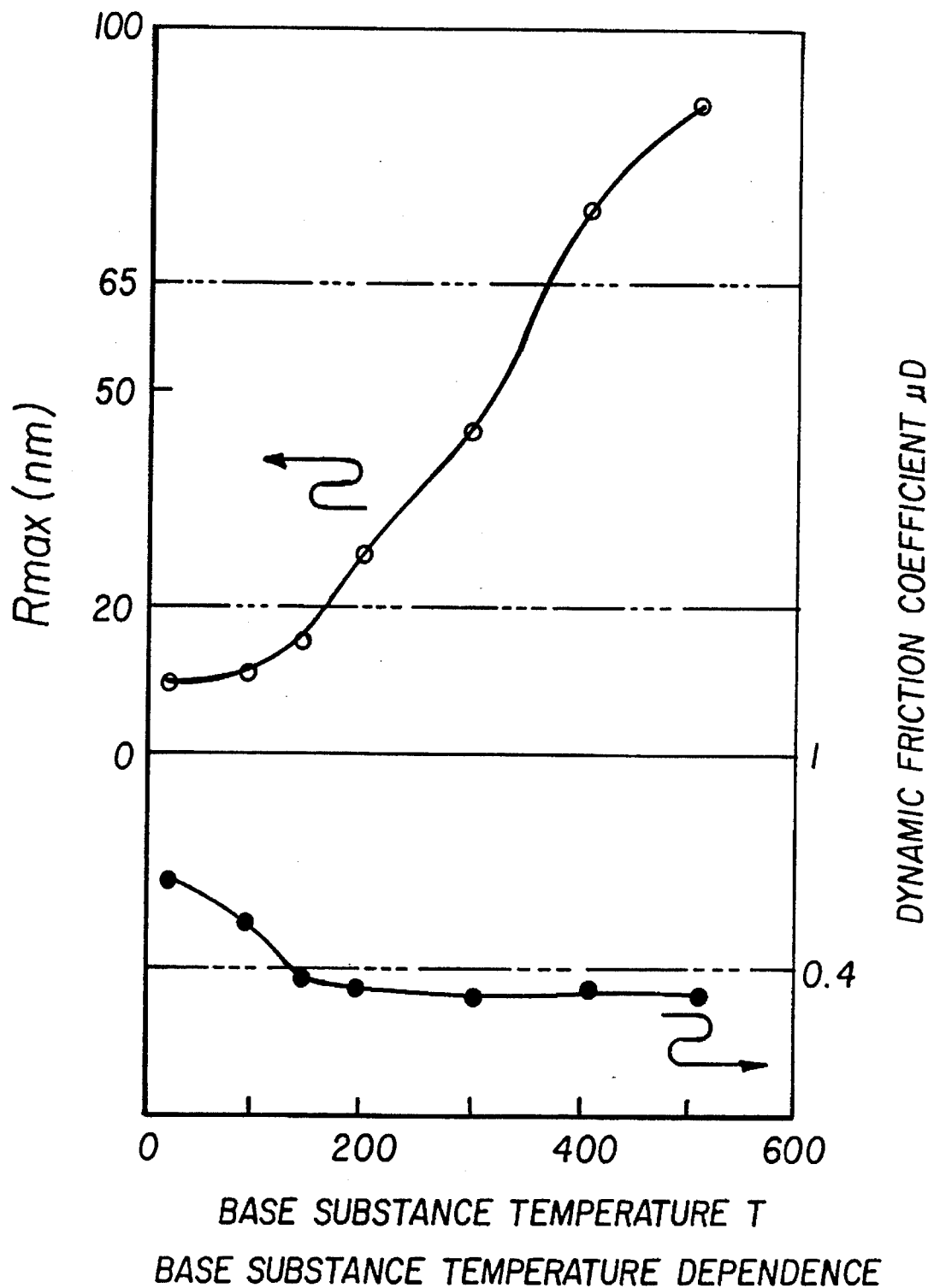
FIG. 5 is a graphic drawing showing the surface roughness on the magnetic recording disk (the maximum height $R_{max}$) associated with the change in the base temperature when the metal deposits are formed.

FIG. 5 shows the surface roughness on the magnetic recording disk (the maximum height $R_{max}$) associated with changes in the temperature T in the base 1 when the metal deposits 6 are formed, as well as changes in the dynamic friction coefficient $\mu_D$.

In this figure, as temperature T in the base 1 becomes higher, the maximum height $R_{max}$ becomes larger, and the dynamic friction coefficient value $\mu_D$ becomes smaller. Therefore, if only the dynamic friction coefficient $\mu_D$ is observed, as temperature T in the base 1 becomes higher, the value for the dynamic friction coefficient $\mu_D$ may be assumed to become smaller. Hence, a magnetic recording disk that has excellent sliding characteristics can be realized. However, as can be seen in Table 1, if the maximum height $R_{max}$ exceeds a predetermined value, problems related to the flotation characteristics, including a head crash, may can occur. If these factors are taken into consideration, it is understood that in order to realize a magnetic recording disk with both a good dynamic friction coefficient $\mu_D$ and a good static friction coefficient $\mu_s$, it is effective to form the metal deposits 6 when temperature T in the base 1 is within a range from 150° C. to 400° C.

As explained above, because the magnetic recording disks 10 and 10a in the first and second embodiments have metal deposits 6 on either the surface of the base 1 or the surface of the magnetic layer 3, ultrafine irregularities reflecting the shapes of the metal deposits 6 on the disk surface can be formed. Therefore, it is possible to realize a magnetic recording disc with a small dynamic friction coefficient $\mu_D$ value and a small static friction coefficient $\mu_s$ value which enable a magnetic head to keep a floating distance as small as 1 to 3 µ inches. Consequently, the wear resistance characteristics and the adsorption resistance characteristics are improved, and the flotation distance for the magnetic head can be reduced, thereby realizing a magnetic recording disk with high recording density.

While the first embodiment and the second embodiment of the present invention have used aluminum as a non-magnetic metal to form the metal deposits, the type of metal should not be limited to aluminum; rather, it may be one type of metal selected from a group consisting of Ta, Ti, Si, B, Zr and Cr including aluminum, or alloys consisting of two or more types of the above metals. Where a glass plate was used as a non-magnetic support for the non-magnetic base in the present invention, obviously a ceramic plate, aluminum plate, titanium metal plate, carbon plate or silicon plate may be also used.

As explained above, the magnetic recording medium according to the present invention is characterized in that on at least one of the surface of a non-magnetic base and a thin-film magnetic layer, irregularities distributed discretely by means of non-magnetic metal deposits containing nitrogen are formed, and these irregularities are reflected up to the surface of the protective layer. Therefore, according to the present invention, because ultrafine irregularities are formed on the surface of the magnetic recording medium, the coefficient of friction between the magnetic recording medium and the magnetic head can be reduced, as can the flotation of the magnetic head. Thus, a magnetic recording medium with a high recording density can be realized.

When the size of the metal deposit "d" is within a range of 15 nm to 200 nm, and the metal deposits are formed with a distance between the metal deposits "t" that is within a range of d/5 to 5d, the recording density of the magnetic recording medium can be increased, and the tribology can be satisfied because the surface roughness on the protective layer can be suppressed to within a range of 3 nm to 7 nm in the average center line roughness Ra and of 20 nm to 65 nm in the maximum height $R_{max}$, while the flotation distance for the magnetic head can be made from 1 µ inch to 3 µ inches.

Additionally, if the non-magnetic metal that forms the metal deposits uses one type of metal selected from a group including Al, Ta, Ti, Si, B, Zr and Cr, or alloys consisting of more than two types of the metals, the metal deposits can be formed using nearly an identical film-forming process regardless of the types of metal or alloy selected because any of these metals has a superior nitride-forming capability. Hence, high productivity results.

What is claimed is:

1. A magnetic recording medium comprising:
   a non-magnetic metallic base layer formed on a surface of a non-magnetic base, a thin film magnetic layer comprising a ferromagnetic alloy formed on the metallic base layer, a plurality of irregularly distributed spaced apart solid phase non-magnetic metal deposits containing nitrogen formed on a surface of the thin film magnetic layer, wherein the average diameter of said metal deposits is in the range between 15 nm to 200 nm, and the space between said metal deposits is in the range between one-fifth to five times the average diameter of said deposits, and a protection layer formed over the non-magnetic metal deposits and the surface of the thin film magnetic layer, wherein said protection layer includes an irregular surface that follows contours of the non-magnetic metal deposits and has a surface roughness within a range of 3 nm to 7 nm at an average center line roughness and a height within a range of 20 nm to 65 nm at a maximum height.

2. A magnetic recording medium as claimed in claim 1, wherein the non-magnetic metal forming said metal deposits is a metal selected from a group consisting of Al, Ta, Ti, Si, B, Zr and Cr, or an alloy of at least two metals in said group.

3. A magnetic recording medium comprising:

a non-magnetic base;

a plurality of irregularly distributed Spaced apart solid phase non-magnetic metal deposits containing nitrogen formed on a surface of the non-magnetic base, wherein the average diameter of said metal deposits is in the range between 15 nm to 200 nm, and the space between said metal deposits is in the range between one-fifth to five times the average diameter of said deposits;

a non-magnetic metallic base layer formed over the non-magnetic metal deposits, wherein the non-magnetic metallic base layer completely covers the non-magnetic metal deposits and contacts the surface of the non-magnetic base at locations between the non-magnetic metal deposits;

a thin film magnetic layer comprising a ferromagnetic alloy formed on the metallic base layer, wherein the thin film magnetic layer is isolated from contacting the non-magnetic metal deposits by said non-magnetic metallic base layer;

and a protection layer formed on the surface of the thin magnetic layer, wherein said protection layer includes an irregular surface that follows contours of the non-magnetic metal deposits and has a surface roughness within a range of 3 nm to 7 nm at an average center line roughness and a height within a range of 20 nm to 65 nm at a maximum height.

4. A magnetic recording medium as claimed in claim 3, wherein the solid phase non-magnetic metal deposits are formed by sputtering in a sputtering gas mixture atmosphere composed of argon gas and nitrogen gas, with said nitrogen gas given a predetermined partial pressure ratio within a range of 0.5% to 20%, and with said non-magnetic base heated to a predetermined temperature within a range from 150° C. to 400° C.

5. A magnetic recording medium as claimed in claim 3, wherein the non-magnetic metal forming said metal deposits is a metal selected from a group consisting of Al, Ta, Ti, Si, B, Zr and Cr, or an alloy of at least two metals in said group.

6. A magnetic recording medium as claimed in claim 1, wherein the solid phase non-magnetic metal deposits are formed by sputtering in a sputtering gas mixture atmosphere composed of argon gas and nitrogen gas, with said nitrogen gas given a predetermined partial pressure ratio within a range of 0.5% to 20%, and with said non-magnetic base heated to a predetermined temperature within a range from 150° C. to 400° C.

\* \* \* \* \*